(12) United States Patent
Zhang (10) Patent No.: US 12,291,142 B2
(45) Date of Patent: May 6, 2025

(54) LIGHT PATH PROCESSING ELEMENT, HEADLAMP MODULE VEHICLE LAMP AND VEHICLE

(71) Applicant: HASCO VISION TECHNOLOGY CO., LTD., Shanghai (CN)

(72) Inventor: Jie Zhang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 95 days.

(21) Appl. No.: 17/769,185

(22) PCT Filed: Mar. 13, 2020

(86) PCT No.: PCT/CN2020/079189
§ 371 (c)(1),
(2) Date: Apr. 14, 2022

(87) PCT Pub. No.: WO2021/093234
PCT Pub. Date: May 20, 2021

(65) Prior Publication Data
US 2024/0101020 A1    Mar. 28, 2024

(30) Foreign Application Priority Data

Nov. 13, 2019  (CN) .......................... 201921964266.2
Nov. 13, 2019  (CN) .......................... 201921972598.5

(51) Int. Cl.
*B60Q 1/14* (2006.01)
*F21S 41/147* (2018.01)
(Continued)

(52) U.S. Cl.
CPC ......... *B60Q 1/1415* (2013.01); *B60Q 1/1438* (2013.01); *F21S 41/147* (2018.01);
(Continued)

(58) Field of Classification Search
CPC ...... F21S 41/147; F21S 41/321; F21S 41/365; F21S 41/338; F21S 41/64; F21S 41/43;
(Continued)

(56) References Cited

U.S. PATENT DOCUMENTS

2006/0120094 A1    6/2006  Tsukamoto et al.

FOREIGN PATENT DOCUMENTS

CN    103119360 A    5/2013
CN    106152059 A    11/2016
(Continued)

*Primary Examiner* — Elmito Breval
(74) *Attorney, Agent, or Firm* — Volpe Koenig (57) ABSTRACT

A light path processing element, comprising an element main body having a cut-off portion, wherein the element main body is a double-sided reflecting plate, or has a protrusion on one side and a reflecting surface on the other side. A headlamp module, comprising a low-beam illumination unit, a high-beam illumination unit, a collimating optical device, and the light path processing element, wherein light rays emitted by the low-beam illumination unit and the high-beam illumination unit can form low-beam and high-beam light patterns under the action of the light path processing element, and the low-beam and high-beam light patterns can be quickly and noiselessly switched between without needing to move the light path processing element. Further disclosed are a vehicle lamp including the headlamp module, and a vehicle including the vehicle lamp.

16 Claims, 6 Drawing Sheets

(51) Int. Cl.
*F21S 41/32* (2018.01)
*F21S 41/365* (2018.01)
*F21W 102/13* (2018.01)
*F21W 102/135* (2018.01)
*F21W 102/155* (2018.01)

(52) U.S. Cl.
CPC ........... *F21S 41/321* (2018.01); *F21S 41/365* (2018.01); *F21W 2102/13* (2018.01); *F21W 2102/135* (2018.01); *F21W 2102/155* (2018.01)

(58) Field of Classification Search
CPC ................ F21S 43/26; F21W 2102/13; F21W 2102/135; F21W 2102/155; B60Q 11/005
See application file for complete search history.

(56) References Cited

FOREIGN PATENT DOCUMENTS

| | | |
|---|---|---|
| CN | 106813176 A | 6/2017 |
| CN | 109681843 A | 4/2019 |
| CN | 209130767 U | 7/2019 |
| JP | 2016091777 A | 5/2016 |

LIGHT PATH PROCESSING ELEMENT, HEADLAMP MODULE VEHICLE LAMP AND VEHICLE

CROSS REFERENCE TO RELATED APPLICATIONS

This application is a 35 U.S.C. § 371 national stage of PCT/CN2020/079189, which is titled "LIGHT PATH PROCESSING ELEMENT HEADLAMP MODULE VEHICLE LAMP AND VEHICLE" and claims priority to Chinese Patent Applications 201921972598.5 and 201921964266.2, filed on Nov. 13, 2019, all of which are incorporated herein by reference as if fully set forth.

FIELD OF THE INVENTION

The present disclosure relates to vehicle lamps, and particularly relates to a light path processing element. The present disclosure further relates to a headlamp module, a vehicle lamp, and a vehicle.

BACKGROUND OF THE INVENTION

Vehicle headlamps include high-beam headlamps and low-beam headlamps. An effective illumination distance of the low-beam headlamps should be 50 m, and an effective illumination distance of the high-beam headlamps should be 150 m. The low-beam headlamps and high-beam headlamps are switched to be used to illuminate the road ahead of a vehicle. The high-beam headlamps have a large angle and a long illumination distance, which can improve the sight and expand the observation field. The low-beam headlamps have a small angle and a short illumination distance, which cannot cause dazzling to other drivers. When vehicles meet, if the high-beam headlamps are used, the driver in the other vehicle will not be able to see a road surface clearly due to the strong light and cannot determine the exact position of the vehicle, which will increase the probability of accidents. In order to prevent the headlamps from causing dazzling to the other driver when the vehicles meet, it is required that the light rays emitted by the low-beam headlamps need to form a clear cut-off line.

In the prior art, a low-beam light pattern can be formed by a traditional light shielding plate. Divergent light emitted by a light source is reflected by a reflective cup and is then concentrated near a perifocus of the reflective cup, and the light is shielded by the light shielding plate to form a cut-off line and is imaged to a road surface through a collimating lens. The light shielding plate is moved away by a driving mechanism to form a high-beam light pattern. The patent CN106152059A discloses a projection-type vehicle low-beam and high-beam LED optical illumination system. A baffle in the vehicle low-beam and high-beam optical illumination system is used for forming a low-beam cut-off line. Low beam and high beam are switched by up-and-down sliding of the baffle. That is, the baffle moves up to form a low-beam light pattern, and the baffle moves down to form a high-beam light pattern.

However, in practical application, position switching of the light shielding plate needs to be driven by a driving mechanism, so that not only is a vehicle lamp structure more complex, and also the switching process is a mechanical movement process, which is subject to inherent defects such as wear, noise and low switching speed easily. Meanwhile, in order to accommodate the driving mechanism of the light shielding plate and provide a space for the position switching of the light shielding plate, the volume of a vehicle lamp module is usually large.

With the increasing needs of users, it is necessary to further simplify a vehicle lamp structure, get rid of the complicated driving mechanism of the light shielding plate, make light patterns clear and stable, and achieve fast and noiseless switching between low beam and high beam.

SUMMARY OF THE INVENTION

The technical problem to be solved in a first aspect of the present disclosure is to provide a light path processing element which can noiselessly achieve quick switching between low beam and high beam.

The technical problem to be solved in a second aspect of the present disclosure is to provide a headlamp module which has no noise during switching between low beam and high beam and has high switching speed.

The technical problem to be solved in a third aspect of the present disclosure is to provide a vehicle lamp which has noiseless switching between low beam and high beam and is convenient and quick for switching.

The technical problem to be solved in a fourth aspect of the present disclosure is to provide a vehicle which does not generate noise during switching between low beam and high beam, and has high light pattern switching speed and high stability.

In order to solve the above technical problems, in the first aspect, the present disclosure provides a light path processing element, including an element main body. The element main body has a cut-off portion used for forming a cut-offline; the light path processing element is a reflecting element; the element main body is a double-sided reflecting plate including a low-beam reflecting surface and a high-beam reflecting surface; the cut-off portion is arranged or formed at one end of the low-beam reflecting surface; or, the light path processing element is a light shielding element; the element main body is a light shielding plate main body; the light shielding plate main body includes a protrusion and a reflecting surface located on opposite surfaces of the light shielding plate main body; and the protrusion has the cut-off portion used for forming a cut-off line.

In the second aspect, the present disclosure provides a headlamp module, including a low-beam illumination unit, a high-beam illumination unit, a collimating optical device having a focus, and a light path processing element. The light path processing element adopts the reflecting element in the light path processing element provided in the first aspect of the present disclosure; the light path processing element is arranged on a side of the collimating optical device close to the low-beam illumination unit and the high-beam illumination unit; the cut-off portion at one end of the light path processing element is located on a convergence point of the emergent light rays of the low-beam illumination unit; the low-beam illumination unit is positioned such that the convergence point of the emergent light rays and the focus of the collimating optical device are symmetric about the low-beam reflecting surface; the high-beam illumination unit is positioned such that a convergence point of the emergent light rays is located on the focus of the collimating optical device or the convergence point of the emergent light rays and the focus of the collimating optical device are symmetric about the high-beam reflecting surface; or, the low-beam illumination unit is positioned such that a convergence point of a low-beam light source is located on the focus of the collimating optical device, and the high-beam illumination unit is positioned such that the convergence point of the emergent light rays and the focus of the collimating optical device are symmetric about the high-beam reflecting surface.

Preferably, the low-beam illumination unit includes a low-beam condensation element and a low-beam light source located at a first focus of the low-beam condensation element; the high-beam illumination unit includes a high-beam condensation element and a high-beam light source located at a first focus of the high-beam condensation element.

As one preferable structural form of the present disclosure, the low-beam condensation element and the high-beam condensation element are both ellipsoid reflective cups.

More preferably, reflection-enhancing films are arranged on surfaces of the low-beam condensation element and the high-beam condensation element.

As another preferable structural form of the present disclosure, the low-beam condensation element and the high-beam condensation element are both condensers, or one of the low-beam condensation element and the high-beam condensation element is an ellipsoid reflective cup, and the other one of the low-beam condensation element and the high-beam condensation element is a condenser.

Preferably, the headlamp module further includes a radiator; the radiator is connected to a circuit board used for mounting the low-beam light source and the high-beam light source; and a single side or double sides of a radiating fin of the radiator are provided with rugged and wavy curved surfaces.

Preferably, the headlamp module further includes a lens support, and an inner surface of the lens support is provided with a light elimination coating layer.

Preferably, the low-beam light source and the high-beam light source are light emitting diode (LED) luminous chips, organic LED (OLED) luminous chips, or luminous chips based on a laser light source.

Preferably, the collimating optical device is a convex lenses, a lens group composed of a plurality of lenses, or is a paraboloid-shaped mirror, or is a lens group composed of a lens and a paraboloid-shaped mirror.

As another independent technical solution of the above headlamp module, the present disclosure further provides a headlamp module, including a low-beam illumination unit, a high-beam illumination unit, a lens, and a light path processing element. The light path processing element adopts the light shielding element in the light path processing element provided in the first aspect of the present disclosure; a focus of the lens is located at the cut-off portion of the light shielding element; the low-beam illumination unit is positioned such that a convergence point of the emergent light rays is located on the focus of the lens, and the high-beam illumination unit is positioned such that a convergence point of the emergent light rays and the focus of the lens are symmetric about the reflecting surface.

Preferably, the low-beam illumination unit includes a low-beam condensation element and a low-beam light source located at a first focus of the low-beam condensation element; the high-beam illumination unit includes a high-beam condensation element and a high-beam light source located at a first focus of the high-beam condensation element; a second focus of the low-beam condensation element coincides with the focus of the lens; and a second focus of the high-beam condensation element and the focus of the lens are symmetric about the reflecting surface.

Optionally, the low-beam condensation element and the high-beam condensation element are both ellipsoid reflective cups, the low-beam light source and the high-beam light source are respectively located at first focuses of the ellipsoid reflective cups; or, at least one of the low-beam condensation element and the high-beam condensation element is a condenser, and the low-beam light source and the high-beam light source are respectively located at focuses of incident ends of the corresponding condensers.

Typically, the headlamp module of the present disclosure further includes a radiator, and the radiator is connected to a circuit board used for mounting the low-beam light source and the high-beam light source.

Preferably, the low-beam illumination unit and the high-beam illumination unit are located such that respective emergent light rays are emitted via a lower region of the lens.

Specifically, the low-beam light source and the high-beam light source are LED luminous chips, OLED luminous chips, or luminous chips based on laser.

In the third aspect, the present disclosure provides a vehicle lamp, including the headlamp module according to any one of the technical solutions in the second aspect of the present disclosure.

In the fourth aspect, the present disclosure provides a vehicle, including the vehicle lamp according to the technical solution of the third aspect of the present disclosure.

By means of the above technical solutions, the light shielding element of the present disclosure can achieve switching between low beam and high beam without a driving mechanism, so that the noise impact caused by the traditional switching between low beam and high beam through the driving mechanism is eliminated.

In addition, the headlamp module applying the above light shielding element not only can produce no noise in the low beam and high beam switching process, but also increases the switching speed, has higher stability, simplifies the structure, and is favorable for minimization.

Other advantages of the present disclosure and the technical effects of the preferred implementation modes will be further described in the detailed description of the embodiments hereafter.

DESCRIPTION OF REFERENCE SIGNS

| 1 light path processing element | 11 element main body |
| 12 cut-off portion | 13 low-beam reflecting surface |
| 14 high-beam reflecting surface | 15 protrusion |
| 16 reflecting surface | 2 collimating optical device |
| 21 lens | 22 mirror |
| 31 low-beam light source | 32 low-beam condensation element |
| 41 high-beam light source | 42 high-beam condensation element |
| 43 second focus of high-beam condensation element | 5 radiator |
| | 7 lens support |
| 6 circuit board | | f: focal length of a collimating optical device

D1: distance between a light source convergence point of a low-beam illumination unit and a focus of a collimating optical device D2: distance between a light source convergence point of a high-beam illumination unit and a focus of a collimating optical device D3: distance between a second focus of the high-beam condensation element and a reflecting surface

DETAILED DESCRIPTION OF THE EMBODIMENTS

Specific implementation modes of the present disclosure will be described in detail below in combination with the accompanying drawings. It should be understood that the specific implementation modes described herein are only used to illustrate and explain the present disclosure, and are not intended to limit the present disclosure.

In addition, the terms "first" and "second" are only used for descriptive purposes, and cannot be understood as indicating or implying relative importance or implicitly indicating the number of technical features indicated. Therefore, the features limited to "first" and "second" may explicitly or implicitly include one or more of the features.

In the description of the present disclosure, it should be noted that the terms "connect", "mount", and "arrange" should be understood in a broad sense unless otherwise specified and limited. For example, it may be fixed connection, may also be detachable connection, or integrated connection, or may be direct connections or indirect connections through an intermediate medium, or may be internal connection of two elements or interaction between two elements. For those of ordinary skill in the art, the specific meanings of the above terms in the present disclosure can be understood according to specific situations.

Figure 1:
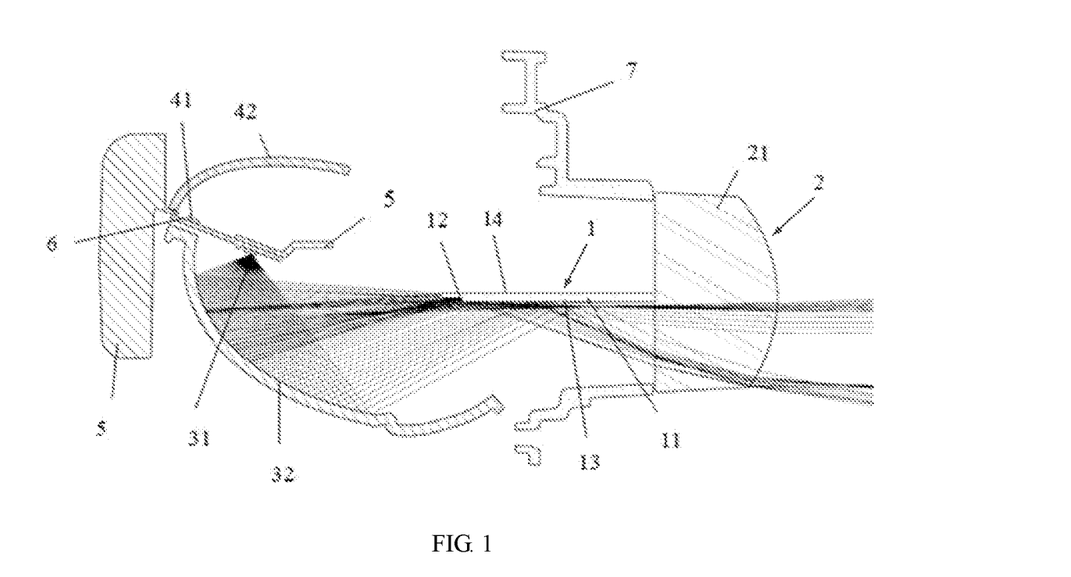
FIG. 1 illustrates a diagram of a longitudinal section and a schematic diagram of a low-beam light path according to an embodiment of a headlamp module of the present disclosure.

It should be understood that, as shown in FIG. 1, based on a headlamp module, along a light emergent direction, "front" refers to an end where a collimating optical device 2 is located, and "rear" refers to an end where a radiator 5 is located, which are the same as front and back orientations of normal mounting of the headlamp module. "Up" and "down" refer to upper and lower orientations of the headlamp module itself. The terms are based on orientations or positional relationships shown in the drawings, and are only to facilitate the description of the present disclosure and simplify the description, instead of indicating or implying that specified devices or elements need to have specific orientations and be constructed and operated in specific orientations, so that the terms cannot be understood as limiting the present disclosure.

Referring to FIG. 1 to FIG. 7, a light path processing element 1 in a basic solution of the present disclosure includes an element main body 11. The light path processing element 1 is a reflecting element. The element main body 11 is a double-sided reflecting plate including a low-beam reflecting surface 13 and a high-beam reflecting surface 14. One end of the low-beam reflecting surface 13 has a cut-off portion 12 used for forming a cut-off line. The cut-off portion 12 may be a groove that is formed in a surface of the low-beam reflecting surface 13 and has a cut-off line shape, referring to FIG. 1, or may also be a protrusion that is formed in a surface of the low-beam reflecting surface 13 and has a cut-off line shape, referring to FIG. 4. The light path processing element 1 may be formed as a reflective surface made from a plastic, glass or metal material by surface treatment, or a reflective surface directly by a smooth metal surface with a certain reflectivity. At the same time, reflection-enhancing films may be arranged on surfaces of the low-beam reflecting surface 13 and the high-beam reflecting surface 14 to enhance a reflecting effect.

Figure 11:
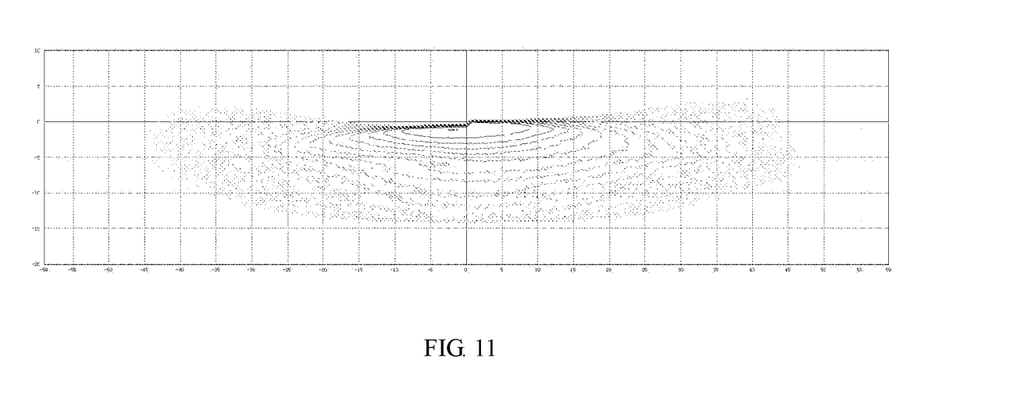
FIG. 11 is a schematic diagram of low-beam plane illuminance according to an embodiment of the present disclosure.

In the above basic solution, after a light source is reflected by the cut-off portion 12 of the reflecting element for forming the cut-off line, referring to FIG. 11, a low-beam light pattern with a cut-off line can be formed. The light path processing element 1 can form a virtual image of a convergence point of light rays reflected by the low-beam reflecting surface 13 and/or the high-beam reflecting surface 14 through the low-beam reflecting surface 13 and/or the high-beam reflecting surface 14 without moving up and down, so that high beam and low beam seen by human eyes are emitted from a same fixed position.

Figure 2:
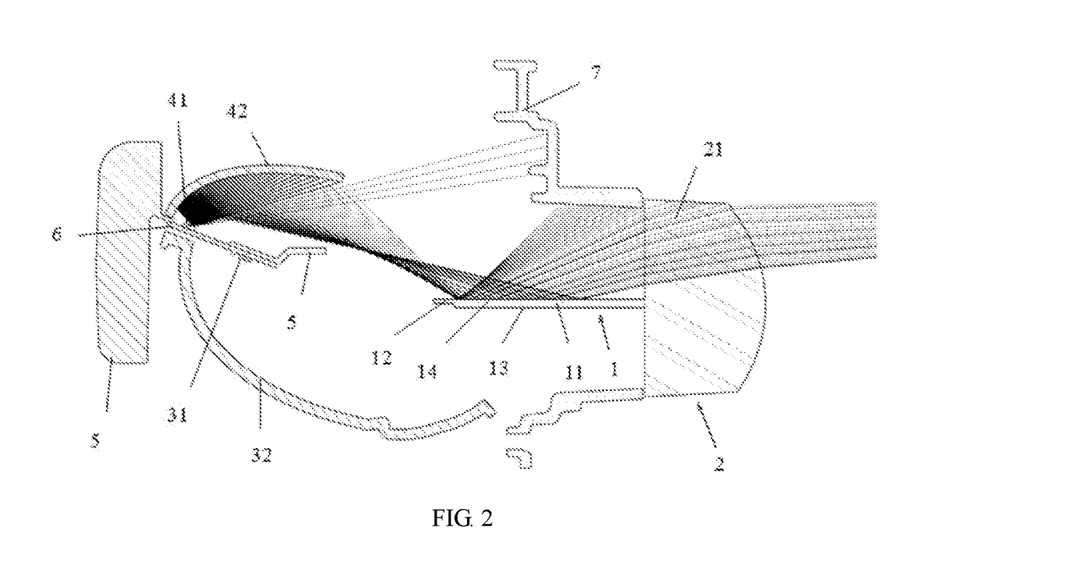
FIG. 2 illustrates a diagram of a longitudinal section and a schematic diagram of a high-beam light path according to an embodiment of a headlamp module of the present disclosure.
Figure 3:
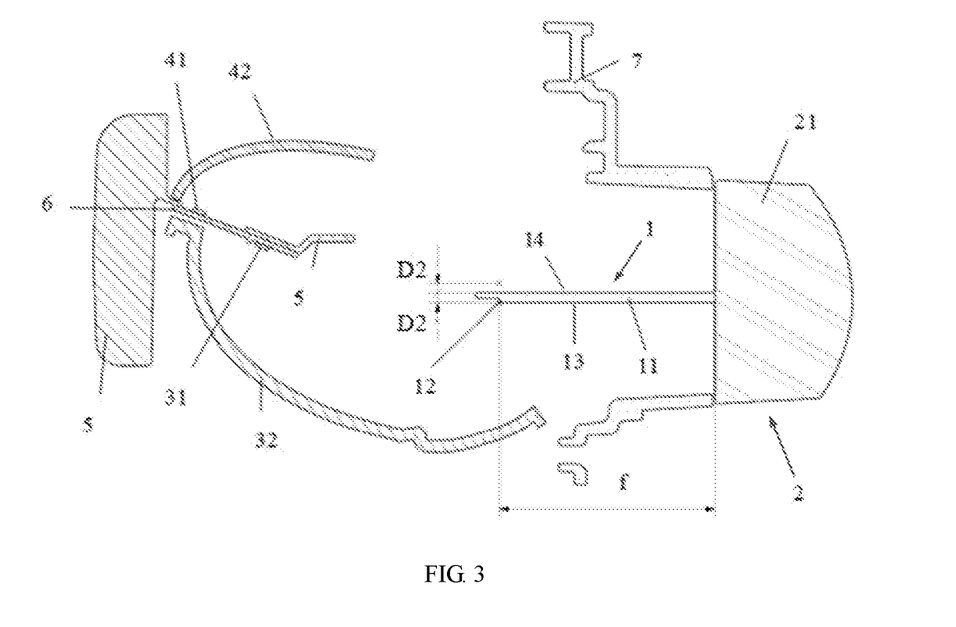
FIG. 3 illustrates a schematic diagram of a virtual image formed by a reflecting plate according to an embodiment of a headlamp module of the present disclosure.

A headlamp module disclosed by the present disclosure, referring to FIG. 1, FIG. 2 and FIG. 3, includes a low-beam illumination unit, a high-beam illumination unit, a collimating optical device 2 having a focus, and a reflecting element used as the light path processing element 1 of the present disclosure. The reflecting element is arranged on a side of the collimating optical device 2 close to the low-beam illumination unit and the high-beam illumination unit; the cut-off portion 12 at one end of the element main body 11 is located on a convergence point of emergent light rays of the low-beam illumination unit; the low-beam illumination unit is positioned such that the convergence point of the emergent light ray and the focus of the collimating optical device 2 are symmetric about the low-beam reflecting surface 13; the high-beam illumination unit is positioned such that a convergence point of an emergent light ray is located on the focus of the collimating optical device 2 or the convergence point of the emergent light ray and the focus of the collimating optical device 2 are symmetric about the high-beam reflecting surface 14; or, the low-beam illumination unit is positioned such that a convergence point of a low-beam light source is located on the focus of the collimating optical device 2, and the high-beam illumination unit is positioned such that the convergence point of the emergent light ray and the focus of the collimating optical device 2 are symmetric about the high-beam reflecting surface 14.

In the headlamp module, the low-beam illumination unit and the high-beam illumination unit can respectively provide converged light sources; and the cut-off portion 12 at one end of the element main body 11 is located on the convergence point of the emergent light ray of the low-beam illumination unit, and certainly, may also be located at a position near the convergence point. In such a structure, the cut-off portion 12 has a shape of a low-beam cut-off line to cut off a low-beam light ray to form a low-beam light pattern; and the light ray is emitted to a lower portion of the collimating optical device 2 after being reflected by the low-beam reflecting surface 13 and forms the low-beam light pattern after being refracted by the collimating optical device 2. By means of the light path processing element 1 provided by the present disclosure, a virtual image of a light source convergence point of the low-beam illumination unit and a high-beam light source convergence point coincide with the focus of the collimating optical device 2; or, the virtual image of the light source convergence point of the low-beam illumination unit and a virtual image of the high-beam light source convergence point coincide with the focus of the collimating optical device 2; or, the low-beam light source convergence point and the virtual image of the high-beam light source convergence point coincide with the focus of the collimating optical device 2.

The headlamp module has a simple structure, and the light path processing element 1 does not need to move. Therefore, noiseless switching between low beam and high beam can be achieved without a driving mechanism of a light shielding plate required in the traditional headlamp module; switching between low beam and high beam can be achieved by only controlling the low-beam light source and the high-beam light source to be turned on and turned off; and the switching speed is high, and light patterns are clear and stable.

As one preferable structural form, the low-beam illumination unit includes a low-beam condensation element 32 and a low-beam light source 31 located at a first focus of the low-beam condensation element 32; the high-beam illumination unit includes a high-beam condensation element 42 and a high-beam light source 41 located at a first focus of the high-beam condensation element 42.

Specifically, the low-beam condensation element 32 and the high-beam condensation element 42 are both ellipsoid reflective cups.

In order to facilitate the description, the ellipsoid reflective cups are respectively referred to as a low-beam reflective cup and a high-beam reflective cup; the low-beam reflective cup is used for converging divergent light emitted by the low-beam light source 31; and the high-beam reflective cup is used for converging divergent light emitted by the high-beam light source 41. The low-beam light source 31 is located at a first focus of the low-beam reflective cup, and the high-beam light source 41 is located at a first focus of the high-beam reflective cup.

Figure 12:
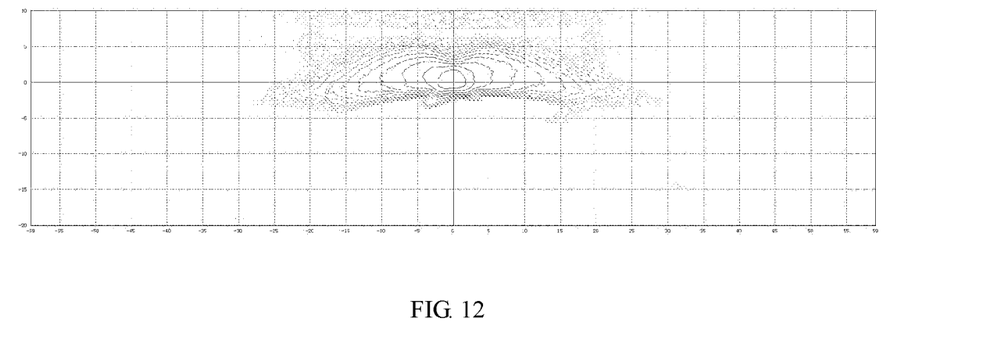
FIG. 12 is a schematic diagram of high-beam plane illuminance according to an embodiment of the present disclosure.

Referring to FIG. 1, when a second focus of the low-beam reflective cup coincides with the focus of the collimating optical device 2, and a virtual image, formed by the high-beam reflecting surface 14, of a second focus of the high-beam reflective cup coincides with the focus of the collimating optical device 2, light rays emitted by the low-beam light source 31 are converged at the second focus of the low-beam reflective cup after being reflected by the low-beam reflective cup, and the light rays converged at the second focus of the low-beam reflective cup are incident, after being cut off by the cut-off portion 12, into the collimating optical device 2 and form, after being refracted by the collimating optical device 2, a clear low-beam light pattern with a cut-off line, as shown in FIG. 11; and referring to FIG. 2, light rays emitted by the high-beam light source 41 are converged, after being reflected by the high-beam reflective cup, at the second focus of the high-beam reflective cup and form, after being upwards reflected by the high-beam reflecting surface and then refracted by the collimating optical device 2, a high-beam light pattern as shown in FIG. 12. When the high-beam light source 41 and the low-beam light source 31 are turned on at the same time, low-beam and high-beam light patterns with reference to FIG. 13 can be formed. Since the high-beam reflecting surface 14 mirrors the second focus of the high-beam reflective cup to coincide with the focus of the collimating optical device 2, the high-beam light pattern seen by human eyes is parallel light that is emitted from the focus of the collimating optical device 2 and has a clear light pattern.

Figure 4:
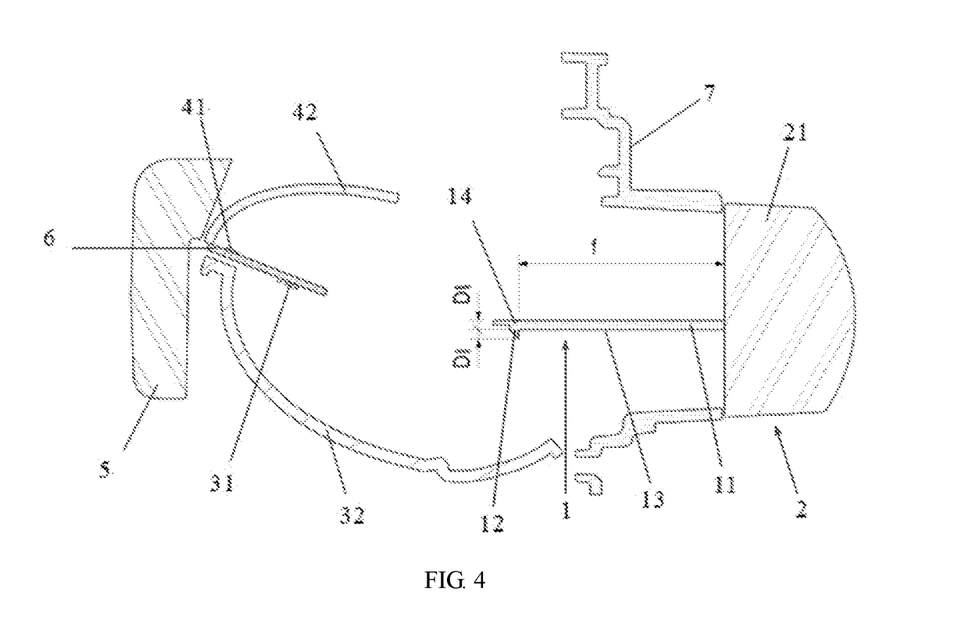
FIG. 4 illustrates a diagram of a longitudinal section according to an embodiment of a headlamp module of the present disclosure.

Referring to FIG. 4, when a virtual image, formed by the low-beam reflecting surface 13, of the second focus of the low-beam reflective cup coincides with the focus of the collimating optical device 2, and the second focus of the high-beam reflective cup coincides with the focus of the collimating optical device 2, light rays emitted by the low-beam light source 31 are converged at the second focus of the low-beam reflective cup after being reflected by the low-beam reflective cup, and the light rays converged at the second focus of the low-beam reflective cup are incident, after being cut off by the cut-off portion 12, into the collimating optical device 2 and form, after being refracted by the collimating optical device 2, a clear low-beam light pattern with a cut-off line, as shown in FIG. 11; and light rays emitted by the high-beam light source 41 are converged, after being reflected by the high-beam reflective cup, at the second focus of the high-beam reflective cup and form, after being upwards reflected by the high-beam reflecting surface 14 and then refracted by the collimating optical device 2, a high-beam light pattern as shown in FIG. 12. When the high-beam light source 41 and the low-beam light source 31 are turned on at the same time, low-beam and high-beam light patterns with reference to FIG. 13 can be formed. Since the low-beam reflecting surface 13 mirrors the second focus of the low-beam reflective cup to coincide with the focus of the collimating optical device 2, the low-beam light pattern seen by human eyes is a clear low-beam light pattern that is emitted from the focus of the collimating optical device 2 and has a cut-off line.

Figure 5:
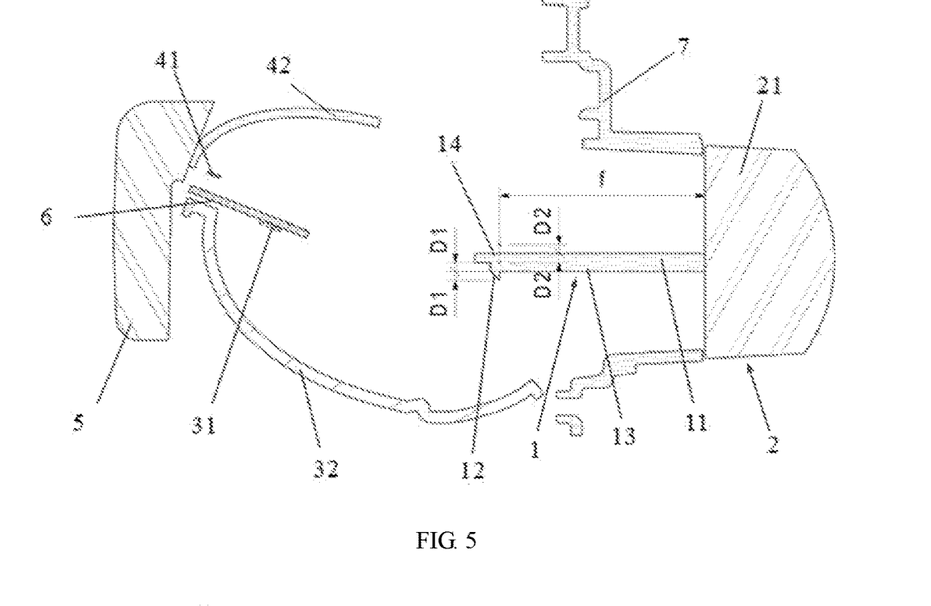
FIG. 5 illustrates a diagram of a longitudinal section according to another embodiment of a headlamp module of the present disclosure.
Figure 13:
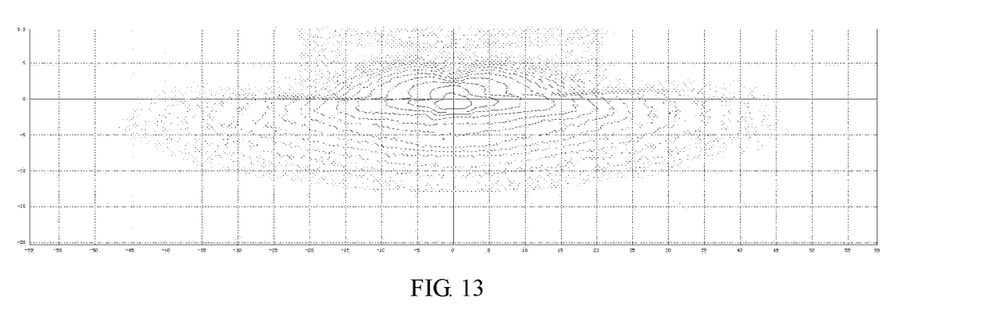
FIG. 13 is a schematic diagram of low-beam and high-beam plane illumination according to an embodiment of the present disclosure.

Referring to FIG. 5, when the virtual image, formed by the low-beam reflecting surface 13, of the second focus of the low-beam reflective cup coincides with the focus of the collimating optical device 2, and the virtual image, formed by the high-beam reflecting surface 14, of the second focus of the high-beam reflective cup coincides with the focus of the collimating optical device 2, light rays emitted by the low-beam light source 31 are converged at the second focus of the low-beam reflective cup after being reflected by the low-beam reflective cup, and the light rays converged at the second focus of the low-beam reflective cup are incident, after being cut off by the cut-off portion 12, into the collimating optical device 2 and form, after being refracted by the collimating optical device 2, a clear low-beam light pattern with a cut-off line, as shown in FIG. 11; and light rays emitted by the high-beam light source 41 are converged, after being reflected by the high-beam reflective cup, at the second focus of the high-beam reflective cup and form, after being upwards reflected by the high-beam reflecting surface and then refracted by the collimating optical device 2, a high-beam light pattern as shown in FIG. 12. When the high-beam light source 41 and the low-beam light source 31 are turned on at the same time, low-beam and high-beam light patterns with reference to FIG. 13 are formed. Since the low-beam reflecting surface 13 mirrors the second focus of the low-beam reflective cup to coincide with the focus of the collimating optical device 2, and the high-beam reflecting surface 14 mirrors the second focus of the high-beam reflective cup to coincide with the focus of the collimating optical device 2, the low beam seen by human eyes has a clear low-beam light pattern that is emitted from the focus of the collimating optical device 2 and has a cut-off line, and the high beam seen is parallel high beam emitted from the focus of the collimating optical device 2.

Preferably, reflection-enhancing films are arranged on the surfaces of the ellipsoid reflective cups to improve the reflectivity of the reflective cups, thus further increasing the light energy utilization rate.

As another preferable structural form of the present disclosure, the low-beam condensation element 32 and the high-beam condensation element 42 are both condensers. The light pattern effect of the condenser is worse than that achieved by the reflective cup, particularly when the condenser is used as a low-beam optical element, but the condenser can play a role in converging light rays to the focus of the collimating optical device 2, and dimming is more convenient. Of course, the combination form that the low-beam condensation element 32 adopts the condenser, and the high-beam condensation element 42 adopts the ellipsoid reflective cup; or, the low-beam condensation element 32 adopts the ellipsoid reflective cup, and the high-beam condensation element 42 adopts the condenser can be used too.

Further preferably, the radiator 5 is connected to a circuit board 6 used for mounting the low-beam light source 31 and the high-beam light source 41; and a single side or double sides of a radiating fin of the radiator 5 are provided with rugged and wavy curved surfaces. When the temperature of the position of an LED lamp bead exceeds its own sustainable limit, light decay quickly occurs in the lamp bead, vehicle lamps dim, and the service lives are greatly shortened. In a severe case, the failure of the vehicle lamps and even traffic accidents may occur. The radiator 5 is arranged on the circuit board 6, so that the heat of the position of the lamp bead can be conducted away from the headlamp module as soon as possible, and the service life of the headlamp module is prolonged.

Preferably, the headlamp module includes a lens support 7 used for mounting the collimating optical device 2, and an inner surface of the lens support 7 is provided with a light elimination coating layer. Most of light rays enter the collimating optical device 2 after being reflected by the light path processing element 1, and a small part of the light rays are emitted to the lens support 7 used for mounting the collimating optical device 2. Since the inner surface of the lens support 7 is provided with the light elimination coating layer, stray light that is reflected by the lens support 7 into the collimating optical device 2 and is refracted by the lens support 7 to the outside can be eliminated.

Preferably, the low-beam light source 31 and the high-beam light source 41 are LED luminous chips, OLED luminous chips, or luminous chips based on a laser light source. The LED luminous chips, the OLED luminous chips, and the luminous chips based on the laser light source occupy a small volume, so that the appearance of a vehicle lamp is more diverse, and the vehicle lamp has a long service life, high efficiency and high lighting-up response speed.

Figure 6:
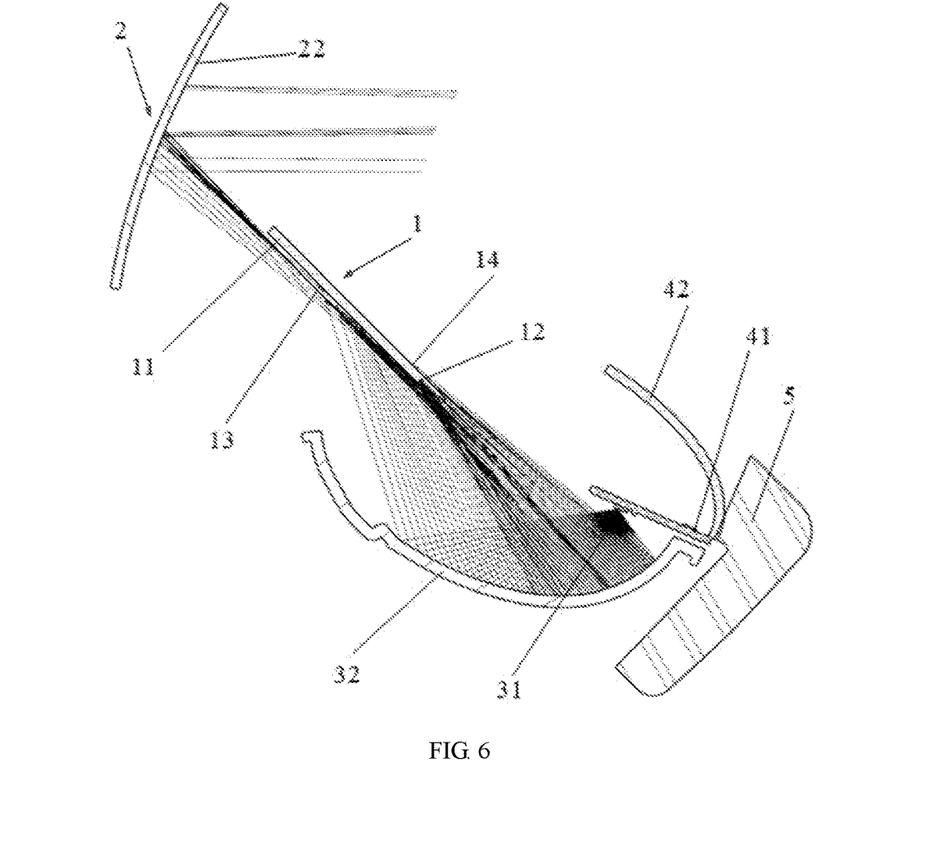
FIG. 6 illustrates a diagram of a longitudinal section and a schematic diagram of a low-beam light path according to an embodiment of a headlamp module of the present disclosure.
Figure 7:
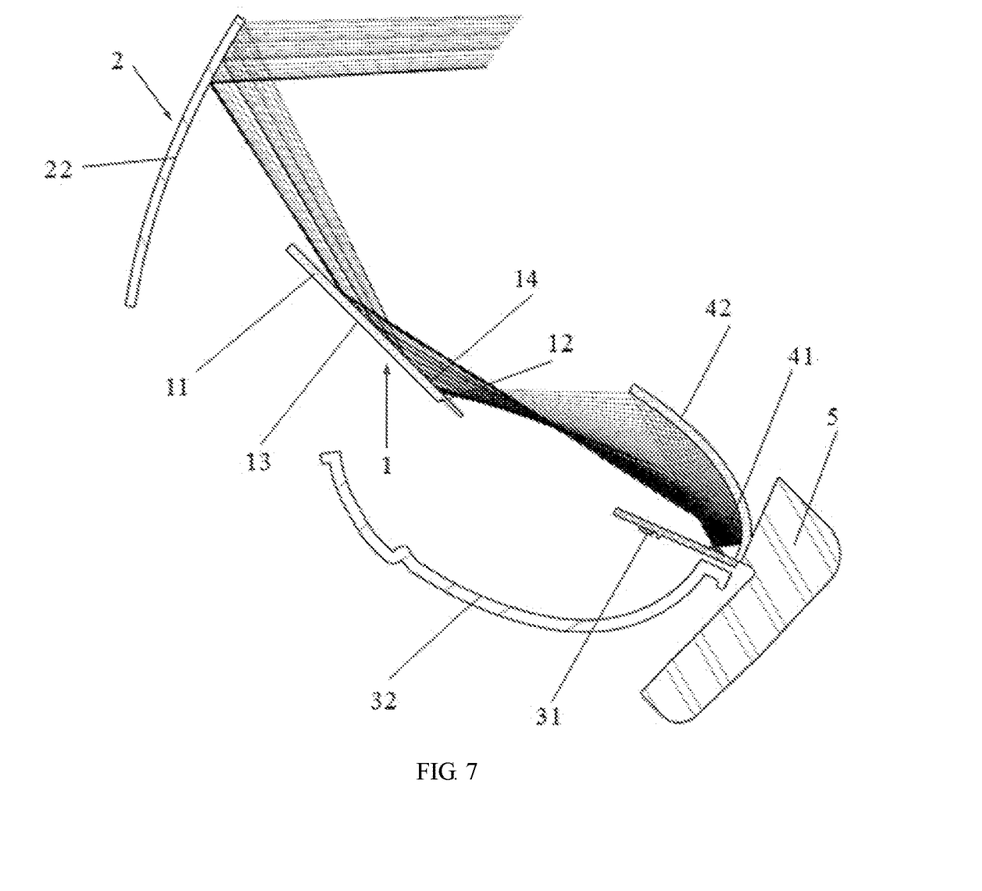
FIG. 7 illustrates a diagram of the longitudinal section and a schematic diagram of a high-beam light path according to the embodiment of FIG. 6.

Preferably, the collimating optical device 2 is a lens group composed of a plurality of lenses 21, or a paraboloid-shaped mirror 22, or a lens group composed of a lens 21 and a paraboloid-shaped mirror 22. Referring to FIG. 6 and FIG. 7, the collimating optical device 2 can not only use a common plano-convex lens 21 and also use the paraboloid-shaped mirror 22, which can also play a role in changing a light path. Light rays reflected by the paraboloid-shaped mirror 22 form parallel light.

Referring to FIG. 1 to FIG. 3, the headlamp module in a preferred embodiment of the present disclosure includes the ellipsoid low-beam reflective cup and high-beam reflective cup, and the reflection-enhancing films are arranged on the surfaces of the reflective cups. Curvature radiuses of the low-beam reflective cup and the high-beam reflective cup and relative positions of the two reflective cups are adjusted, such that the second focus of the low-beam reflective cup and a virtual focus formed by that the second focus of the high-beam reflective cup is mirrored by the high-beam reflecting surface 12 coincide with the cut-off portion 12 of the light path processing element 1; an angle of the circuit board 6 and positions of the low-beam light source 31 and the high-beam light source 41 on the circuit board 6 are adjusted, so that the low-beam light source 31 is placed at the first focus of the low-beam reflective cup, and the high-beam light source 41 is placed at the first focus of the high-beam reflective cup. Referring to FIG. 1, only the low-beam light source 31 is turned on; light rays emitted by the low-beam light source 31 are converged at the second focus of the low-beam reflective cup after being reflected by the low-beam reflective cup; and the light rays converged at the second focus of the low-beam reflective cup are incident, after being cut off by the cut-off portion 12, into the collimating optical device 2 and form, after being refracted by the collimating optical device 2, a clear low-beam light pattern with a cut-off line, as shown in FIG. 11. Referring to FIG. 2, only the high-beam light source 41 is turned on; light rays emitted by the high-beam light source 41 are converged, after being reflected by the high-beam reflective cup, at the second focus of the high-beam reflective cup, i.e., a position above the high-beam reflecting surface 14; a virtual focus formed by reflection of a mirror surface of the high-beam reflecting surface 14 coincides with the second focus of the low-beam reflective cup and the cut-off portion 12 of the light path processing element 1; and the high-beam light source 41 is upwards reflected by the high-beam reflecting surface 14 and then is refracted by the collimating optical device 2 to form a high-beam light pattern as shown in FIG. 12. When the high-beam light source 41 and the low-beam light source 31 are turned on at the same time, the above low-beam light pattern and high-beam light pattern are superimposed to form the low-beam and high-beam light patterns as shown in FIG. 13. The low-beam light source 31 is converged, by the low-beam reflective cup, at the place that the focus of the collimating optical device 2 coincides with the cut-off portion 12 of the light path processing element 1, so that the light source utilization rate can be increased, and a clear low-beam light pattern with a cut-off line can be formed. The second focus of the high-beam reflective cup is mirrored by the high-beam reflecting surface 14 to coincide with the focus of the collimating optical device 2. After light rays are emitted from the collimating optical device 2, a high-beam light pattern seen by human eyes is clear parallel light. In this way, the virtual image of the second focus of the high-beam reflective cup and the second focus of the low-beam reflective cup can both coincide with the focus of the collimating optical device 2 without moving the light path processing element 1 up and down, the headlamp module can achieve noiseless switching between low beam and high beam and has high switching speed and clear and stable light patterns.

Figure 8:
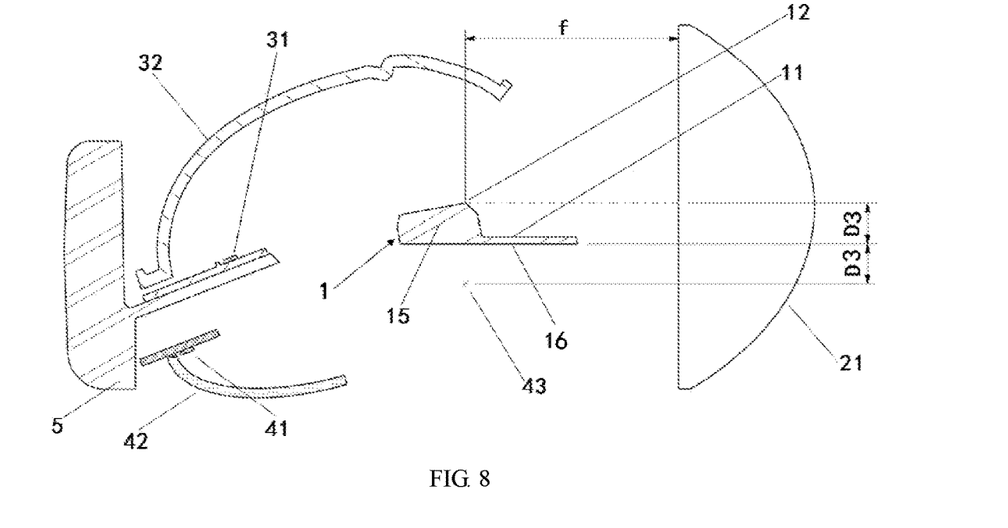
FIG. 8 is a schematic structural diagram of an embodiment of the present disclosure.
Figure 9:
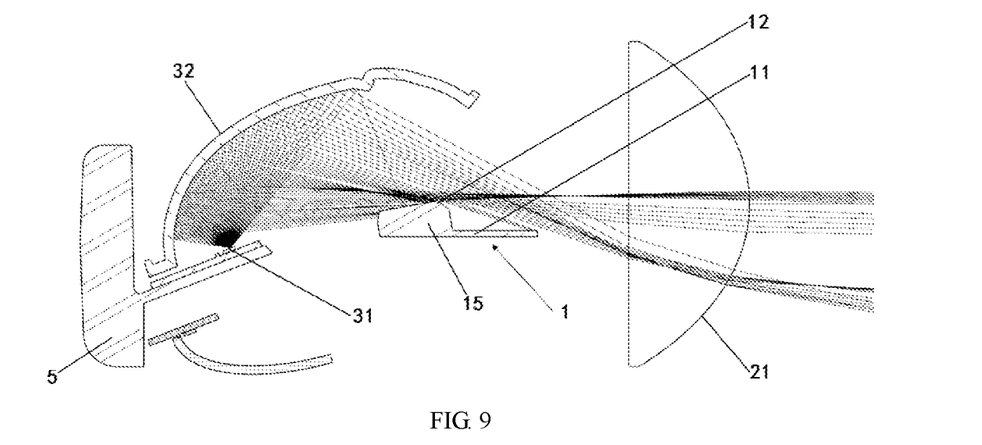
FIG. 9 is a schematic diagram of a low-beam light path according to an embodiment of the present disclosure.
Figure 10:
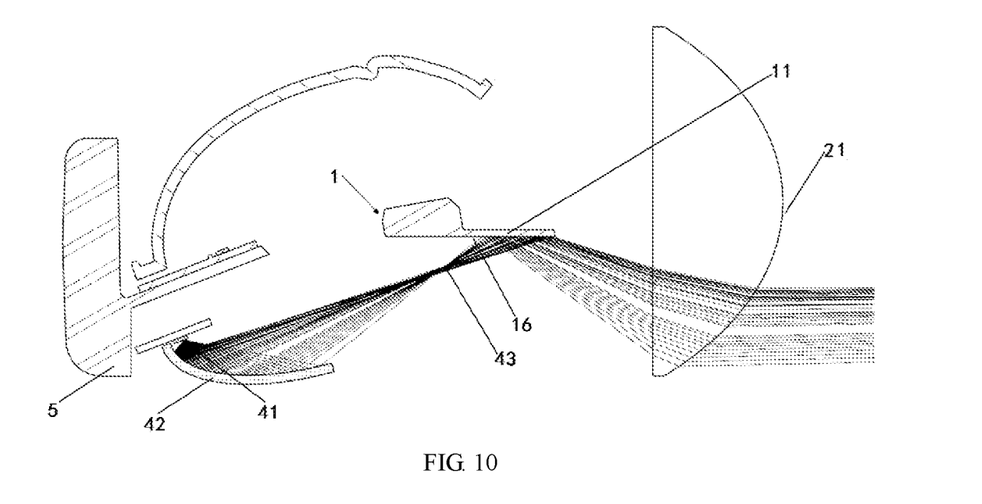
FIG. 10 is a schematic diagram of a high-beam light path according to an embodiment of the present disclosure.

Referring to FIG. 8 to FIG. 10, in one implementation mode, the light path processing element 1 of the present disclosure is a light shielding element, an element main body 11 of which is a light shielding plate main body; the element main body 11 includes a protrusion 15 and a reflecting surface 16; the protrusion 15 and the reflecting surface 14 are respectively located on two opposite surfaces of the light shielding plate main body 11; and a cut-off portion 12 used for forming a cut-off line is formed on the protrusion 15.

On the basis of the implementation mode of the above light path processing element 1, the light path processing element 1 adapts to a low-beam light source, a high-beam light source and a lens of a general vehicle headlamp, and emergent light rays of the low-beam light source and the high-beam light source can form low beam and high beam via the light path processing element 1. Specifically, the light path processing element 1 is arranged on a light path between the low-beam and high-beam light sources and the lens, so that a convergence point of the emergent light rays of the low-beam light source coincides with the focus of the lens and is located on the cut-off portion 12 of the protrusion 15 to form a low-beam light pattern with a cut-off line; furthermore, a convergence point of the emergent light rays of the high-beam light source can be in mirror symmetry with the focus of the lens relative to the reflecting surface 16 to form high beam. The light path processing element 1 has the advantages that compared with the traditional method for controlling, by a driving mechanism, the light shielding plate to achieve switching between low beam and high beam, the driving mechanism is not needed, and the switching between low beam and high beam can be achieved by only controlling the low-beam light source and the high-beam light source to be turned on and turned off, the response is fast, and no mechanical noise is generated.

In order to facilitate understanding of the light path processing element 1 in the implementation mode of the present disclosure, the headlamp module applying the light path processing element 1 is further described below to better explain the technical idea of the present disclosure.

Specifically, the headlamp module of the present disclosure includes a low-beam illumination unit, a high-beam illumination unit, a light path processing element 1, and a lens 21. A focus of the lens 21 is arranged on a cut-off portion 12 of the light path processing element 1. The low-beam illumination unit and the high-beam illumination unit are arranged, such that a convergence point of the emergent light rays of the low-beam illumination unit can be located at the focus of the lens 21, and a convergence point of the emergent light rays of the high-beam illumination unit can be symmetric with the focus of the lens 21 about the reflecting surface 16. Due to the shading and reflecting effect of the light path processing element 1, low beam and high beam can be switched more conveniently, and many shortcomings of the traditional switching method based on the driving mechanism can be avoided, for example, the traditional position switching of the light shielding plate needs to be driven by the driving mechanism, the switching process is a mechanical movement process, so that inherent defects such as wear, noise and low switching speed are easily caused. Furthermore, the light rays emitted by the light sources are converged at the light shielding plate, so that high-energy radiation makes the temperature of the position of the light shielding plate relatively high, which easily leads to looseness, clamping stagnation and other defects of the driving mechanism, resulting in insufficient switching between low beam and high beam and even failure of switching to affect the stability.

It can be understood that the convergence point of the emergent light ray of the low-beam illumination unit can also be located near the focus of the lens 21. Similarly, the convergence point of the emergent light ray of the high-beam illumination unit is not necessarily in strict symmetry with the focus of the lens 21 about the reflecting surface 16, as long as corresponding low-beam light pattern and high-beam light pattern can be formed. These fall within the protection scope of the present disclosure.

Further, the low-beam illumination unit includes a low-beam condensation element 32 and a low-beam light source 31. The low-beam light source 31 is located at a first focus of the low-beam condensation element 32. The high-beam illumination unit includes a high-beam condensation element 42 and a high-beam light source 41. The high-beam light source 41 is located at a first focus of the high-beam condensation element 42. A second focus of the low-beam condensation element 32 coincides with the focus of the lens 21, and the second focus 43 of the high-beam condensation element 42 is symmetric with the focus of the lens 21 about the reflecting surface 16. In this way, emergent light rays of the low-beam light source 31 are converged at the second focus of the low-beam condensation element 32; after being shielded by the cut-off portion 12, the light rays are emitted from the lens 21 to form a low-beam light pattern with a cut-off line. Similarly, emergent light rays of the high-beam light source 41 are converged at the second focus of the high-beam condensation element 42; after being reflected by the reflecting surface 16, the light rays are emitted from the lens 21 to form a required high-beam light pattern. The low-beam light source 31 and the high-beam light source 41 may adopt LED luminous chips, OLED luminous chips, or luminous chips based on a laser light source.

The low-beam condensation element 32 and the high-beam condensation element 42 may have various specific structural forms, for example, the low-beam condensation element 32 and the high-beam condensation element 42 may adopt ellipsoid reflecting surfaces, the low-beam light source 31 and the high-beam light source 41 may be respectively located at the first focuses of the corresponding ellipsoid reflective cups. In this way, by use of the optical performance of the ellipsoid reflective cups, the emergent light rays of the low-beam light source 31 and the high-beam light source 41 can be converged to the second focuses of the corresponding ellipsoid reflective cups via the ellipsoid reflective cups, and the switching between low beam and high beam is achieved by virtue of the action of the light path processing element 1. Alternatively, the low-beam condensation element 32 and the high-beam condensation element 42 may adopt existing condensers, the first focuses of the low-beam condensation element 32 and the high-beam condensation element 42 are the focuses of incident ends of the condensers, the second focuses of the low-beam condensation element 32 and the high-beam condensation element 42 are the focuses of emergent ends of the condensers, the low-beam light source 31 and the high-beam light source 41 are respectively arranged at positions of the focuses of the incident ends of the corresponding condensers, and the emergent light rays of the low-beam light source 31 and the high-beam light source 41 are emitted from the focuses of the corresponding condensers after being converged by the condensers. It can be understood that it is not required that the low-beam condensation element 32 and the high-beam condensation element 42 both adopt the ellipsoid reflective cups or condensers, or one of the low-beam condensation element 32 and the high-beam condensation element 42 adopts the condenser and the other one of the low-beam condensation element 32 and the high-beam condensation element 42 adopts the ellipsoid reflective cup, or the low-beam condensation element 32 and the high-beam condensation element 42 respectively adopt other optical elements capable of achieving the same function, as long as the above optical elements can make the emergent light rays of the low-beam light source 31 be converged at the focus of the lens 21 and make the emergent light rays of the high-beam light source 41 be converged at a position that is in mirror symmetry with the focus of the lens 21 about the reflecting surface 16. As one preferable implementation mode, in the headlamp module of the present disclosure, the positioning and connection relationship between the low-beam illumination and high-beam illumination units and the light path processing element 1 causes the respective emergent light rays of the low-beam illumination unit and the high-beam illumination unit to be able to be emitted from a lower region of the lens 21. In this way, the convention that a high-beam light path is emitted to an upper region of the lens is changed, so that the high-beam light path also passes through the lower region of the lens, that is, the conventional passing region of a low-beam light path, which reduces the occupation of the area of the lens, and is convenient for reducing the volume of the module.

In order to achieve a better heat dissipation effect to ensure a normal working state of the headlamp module, a radiator 5 can be provided, and a circuit board for mounting the low-beam light source and the high-beam light source is mounted on the radiator 5.

As shown in FIG. 8 to FIG. 10, the headlamp module in the preferred implementation mode of the present disclosure includes a low-beam condensation element 32, a low-beam light source 31, a high-beam condensation element 42, a high-beam light source 41, a light path processing element 1, and a lens 21. The low-beam light source 31 is located at a first focus of the low-beam condensation element 32; the high-beam light source 41 is located at a first focus of the high-beam condensation element 42; LED luminous chips, OLED luminous chips, luminous chips based on laser, or other luminous chips can be selected as the low-beam light source 31 and the high-beam light source 41, wherein the low-beam condensation element 32 and the high-beam condensation element 42 may be ellipsoid reflective cups, condensers, and other optical elements with a condensation function. As shown in FIG. 8, when the lens 21 is positioned, the lens 21 is arranged in front of the light path processing element 1, so that the focus of the lens 21 is located at the cut-off portion 12 of the light path processing element 1, that is a horizontal distance between the position of the cut-off portion 12 and the photocenter of the lens 21 is a focal length f of the lens; when the low-beam condensation element 32 and the high-beam condensation element 42 are positioned, the low-beam condensation element 32 and the high-beam condensation element 42 are arranged behind the light path processing element 1, so that the second focus of the low-beam condensation element 32 coincides with the focus of the lens 21, the second focus of the high-beam condensation element 42 and the focus of the lens 21 are in mirror symmetry about the reflecting surface 16, that is, if a distance from the second focus of the high-beam condensation element 42 to the reflecting surface 16 is D3, a distance from the focus of the lens 21 to the reflecting surface 16 is also D3. Compared with the traditional method for switching low beam and high beam by the movement of the light shielding plate, the headlamp module of the present disclosure can achieve the switching between low beam and high beam by only controlling the low-beam light source 31 and the high-beam light source 41 to be turned on and turned off. Furthermore, the switching is fast, no mechanical noise is produced, the structure is simplified, and the cost is reduced. In addition, due to the above arrangement, the emergent light rays of the low-beam light source 31 and the high-beam light source 41 can be emitted from the lower region of the lens 21, so that the demand for the area of the lens is reduced.

Therefore, according to the headlamp module of the present disclosure, a targeted structural design is adopted for the light path processing element 1; by the use of the mirror reflecting effect of the reflecting surface 16 on the emergent light ray of the high-beam light source 41, the light path processing element 1 can conveniently achieve the switching between low beam and high beam, that is, the cut-off portion 12 at the upper portion of the light path processing element 1 can be used for forming a low-beam light pattern, and the reflecting surface 16 at the lower portion of the light path processing element 1 can be used for forming high-beam light patterns. As shown in FIG. 11 to FIG. 13, a schematic diagram of low-beam plane illuminance, a schematic diagram of high-beam plane illuminance, and a schematic diagram of low-beam and high-beam plane illuminance are respectively illustrated. Specifically, divergent light emitted by the low-beam light source 31 is converged near the focus of the lens 21 via the low-beam condensation element 32. Since the cut-off portion 12 has the structure capable of forming a cut-off line, the light rays passing through the cut-off portion 12 can form a low-beam light pattern with a cut-off line when being finally emitted, and the light rays are emitted from the lower region of the lens. Divergent light emitted by the high-beam light source 41 is converged to the second focus 43 of the high-beam condensation element 32 via the low-beam condensation element 32, a virtual focus, formed by the reflecting surface 16, of the second focus 43 is located near the focus of the lens 21. In this way, the light rays reflected by the reflecting surface 16 appears to be coming from the virtual focus to form parallel high beam after passing through the lens, so that the conflict that both a high-beam optical system and a low-beam optical system need to achieve imaging at the focus of the lens 21 is ingeniously solved. The mounting position of the light path processing element 1 is fixed, so that the switching between low beam and high beam can be controlled by only controlling the low-beam light source 31 and the high-beam light source 41 to be turned on and turned off; the driving mechanism of the traditional low-beam and high-beam module used for driving the position switching of the light shielding plate is eliminated, the control program is also simplified, the cost is reduced; and minimization of vehicle lamps is facilitated.

A vehicle lamp in an embodiment of the present disclosure may be provided with the headlamp module described in any of the above embodiments, that is, adopts all the technical solutions of the above all headlamp module embodiments, and therefore at least has all the beneficial effects brought by the technical solutions of the above headlamp module embodiment.

A vehicle in an embodiment of the present disclosure may be provided with the vehicle lamp of the above embodiment, that is, adopts all the technical solutions of the above vehicle lamp embodiment, and therefore at least has all the beneficial effects brought by the technical solutions of the above vehicle lamp embodiment.

The preferred implementation modes of the present disclosure have been described in detail above in combination with the accompanying drawings, but the present disclosure is not limited thereto. Within the scope of the technical concept of the present disclosure, a variety of simple modifications can be made to the technical solutions of the present disclosure, including combinations of individual specific technical features in any suitable manners. In order to avoid unnecessary repetitions, various possible combinations are not described separately in the present disclosure. However, these simple modifications and combinations shall also be regarded as the content disclosed by the present disclosure, and all belong to the protection scope of the present disclosure.

The invention claimed is:

1. A light path processing element, comprising an element main body, the element main body having a cut-off portion used for forming a cut-off line, wherein
   the light path processing element is a reflecting element; the element main body is a double-sided reflecting plate comprising a low-beam reflecting surface and a high-beam reflecting surface; the cut-off portion is arranged or formed at one end of the low-beam reflecting surface, the cut-off portion is a groove that is formed in a surface of the low-beam reflecting surface and has a cut-offline shape, or is a protrusion that is formed in a surface of the low-beam reflecting surface and has a cut-off line shape; or,
   the light path processing element is a light shielding element, the element main body is a light shielding plate main body, the light shielding plate main body comprises a protrusion and a reflecting surface located on opposite surfaces of the light shielding plate main body, and the protrusion has the cut-off portion used for forming the cut-off line.

2. A headlamp module, comprising a low-beam illumination unit, a high-beam illumination unit, a collimating optical device having a focus, and a light path processing element, wherein the light path processing element adopts the reflecting element in the light path processing element of claim 1, the light path processing element is arranged on a side of the collimating optical device close to the low-beam illumination unit and the high-beam illumination unit, and the cut-off portion at one end of the light path processing element is located on a convergence point of the emergent light rays of the low-beam illumination unit;
   the low-beam illumination unit is positioned such that the convergence point of the emergent light rays and the focus of the collimating optical device are symmetric about the low-beam reflecting surface; the high-beam illumination unit is positioned such that a convergence point of the emergent light rays is located on the focus of the collimating optical device or the convergence point of the emergent light rays and the focus of the collimating optical device are symmetric about the high-beam reflecting surface;
   or, the low-beam illumination unit is positioned such that a convergence point of a low-beam light source is located on the focus of the collimating optical device, and the high-beam illumination unit is positioned such that the convergence point of the emergent light rays and the focus of the collimating optical device are symmetric about the high-beam reflecting surface.

3. The headlamp module according to claim 2, wherein the low-beam illumination unit comprises a low-beam condensation element and a low-beam light source located at a first focus of the low-beam condensation element; and the high-beam illumination unit comprises a high-beam condensation element and a high-beam light source located at a first focus of the high-beam condensation element.

4. The headlamp module according to claim 3, wherein the low-beam condensation element and the high-beam condensation element are both ellipsoid reflective cups.

5. The headlamp module according to claim 4, wherein reflection-enhancing films are arranged on surfaces of the ellipsoid reflective cups.

6. The headlamp module according to claim 3, wherein the low-beam condensation element and the high-beam condensation element are both condensers, or one of the low-beam condensation element and the high-beam condensation element is an ellipsoid reflective cup, and the other one of the low-beam condensation element and the high-beam condensation element is a condenser.

7. The headlamp module according to claim 3, further comprising a radiator, wherein the radiator is connected to a circuit board used for mounting the low-beam light source and the high-beam light source; and a single side or double sides of a radiating fin of the radiator are provided with rugged and wavy curved surfaces.

8. The headlamp module according to claim 3, wherein the low-beam light source and the high-beam light source are LED luminous chips, OLED luminous chips, or luminous chips based on a laser light source.

9. The headlamp module according to claim 2, further comprising a lens support, wherein an inner surface of the lens support is provided with a light elimination coating layer.

10. The headlamp module according to claim 2, wherein the collimating optical device is a convex lenses, a lens group composed of a plurality of lenses, or is a paraboloid-shaped mirror, or is a lens group composed of a lens and a paraboloid-shaped mirror.

11. A headlamp module, comprising a low-beam illumination unit, a high-beam illumination unit, a lens, and a light path processing element, wherein the light path processing element adopts the light shielding element in the light path processing element of claim 1, a focus of the lens is located at a cut-off portion of the light shielding element, the low-beam illumination unit is positioned such that a convergence point of the emergent light rays is located on the focus of the lens, and the high-beam illumination unit is positioned such that a convergence point of the emergent light rays and the focus of the lens are symmetric about the reflecting surface.

12. The headlamp module according to claim 11, wherein the low-beam illumination unit comprises a low-beam condensation element and a low-beam light source located at a first focus of the low-beam condensation element, and the high-beam illumination unit comprises a high-beam condensation element and a high-beam light source located at a first focus of the high-beam condensation element; a second focus of the low-beam condensation element coincides with the focus of the lens; and a second focus of the high-beam condensation element and the focus of the lens are symmetric about the reflecting surface.

13. The headlamp module according to claim 12, wherein the low-beam condensation element and the high-beam condensation element are both ellipsoid reflective cups, the low-beam light source and the high-beam light source are respectively located at first focuses of the ellipsoid reflective cups; or,     at least one of the low-beam condensation element and the high-beam condensation element is a condenser, and the low-beam light source and the high-beam light source are respectively located at focuses of incident ends of the corresponding condensers.

14. The headlamp module according to any one of claims 11-13, further comprising a radiator, wherein the radiator is connected to a circuit board used for mounting the low-beam light source and the high-beam light source.

15. The headlamp module according to any one of claims 11-13, wherein the low-beam illumination unit and the high-beam illumination unit are positioned such that respective emergent light rays are emitted via a lower region of the lens.

16. The headlamp module according to claim 12, wherein the low-beam light source and the high-beam light source are LED luminous chips, OLED luminous chips, or luminous chips based on laser.

* * * * *